United States Patent
Benveniste

(10) Patent No.: US 7,688,783 B1
(45) Date of Patent: Mar. 30, 2010

(54) MIXING BASIC SERVICE SET (BSS) TRAFFIC AND MESH FORWARDING TRAFFIC

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 807 days.

(21) Appl. No.: 11/405,213

(22) Filed: Apr. 17, 2006

Related U.S. Application Data

(60) Provisional application No. 60/671,496, filed on Apr. 15, 2005, provisional application No. 60/700,321, filed on Jul. 19, 2005.

(51) Int. Cl.
*H04W 4/00* (2009.01)
(52) U.S. Cl. .................. 370/329; 370/328; 370/341; 455/450; 455/451; 455/452.1
(58) Field of Classification Search .......... 370/329, 370/328, 341; 455/450, 451, 452.1
See application file for complete search history.

(56) References Cited

U.S. PATENT DOCUMENTS

| | | | | |
|---|---|---|---|---|
| 7,095,732 | B1 * | 8/2006 | Watson, Jr. | 370/346 |
| 2002/0071449 | A1 * | 6/2002 | Ho et al. | 370/447 |
| 2005/0124294 | A1 * | 6/2005 | Wentink | 455/41.2 |
| 2005/0232179 | A1 * | 10/2005 | daCosta et al. | 370/315 |
| 2006/0120387 | A1 * | 6/2006 | Yang | 370/401 |
| 2006/0130021 | A1 * | 6/2006 | Plum et al. | 717/140 |
| 2006/0234719 | A1 * | 10/2006 | Demirhan et al. | 455/453 |
| 2007/0041353 | A1 * | 2/2007 | Li et al. | 370/338 |
| 2007/0058665 | A1 * | 3/2007 | Ho et al. | 370/447 |
| 2007/0070922 | A1 * | 3/2007 | Benveniste | 370/254 |
| 2007/0201401 | A1 * | 8/2007 | Benveniste | 370/329 |
| 2007/0217385 | A1 * | 9/2007 | Meier | 370/338 |
| 2007/0299766 | A1 * | 12/2007 | Bril | 705/37 |

\* cited by examiner

*Primary Examiner*—Joseph H Feild
*Assistant Examiner*—Huy D Nguyen
(74) *Attorney, Agent, or Firm*—Chapin IP Law, LLC; David W. Rouille, Esq.

(57) ABSTRACT

A method and apparatus for mixing Basic Service Set (BSS) and mesh traffic is presented. A same channel or a same radio is shared for mesh traffic and BSS traffic. The sharing of the channel including reserving a channel for BSS traffic by a Mesh Access Point (MAP), the reserving comprising sending a CC-RTS or a CC-CTS addressed to the MAP and/or blocking use of the channel by a BSS stations when the channel is not reserved for BSS traffic, the blocking use of the channel comprising the MAP sending a frame setting a NAV in the BSS. The shared radio is switchable between serving the BSS traffic and serving the mesh traffic.

10 Claims, 3 Drawing Sheets

MIXING BASIC SERVICE SET (BSS) TRAFFIC AND MESH FORWARDING TRAFFIC

CROSS REFERENCE TO RELATED APPLICATIONS

The present application claims the benefit of U.S. Provisional Patent Application No. 60/671,496 filed on Apr. 15, 2005 and U.S. Provisional Patent Application No. 60/700,321 filed Jul. 19, 2005 both of which are incorporated herein by reference.

BACKGROUND

Growth in demand for Wireless Local Area Networks (WLANs) is driving the development of new technology to provide higher throughput. To a greater extent this growth is due to the increased number of users and applications desiring wireless transmission and to a lesser extent to the emergence of new applications needing higher transmission rates along a single connection between two points. Previous work has focused on increasing link throughput. This is necessary for single-stream high throughput applications. While it helps increase aggregate throughput, it is not the only way to do so. A MAC-based approach that enables the parallel use of multiple channels in a Basic Service Set (BSS), or a wireless mesh, can increase aggregate throughput.

SUMMARY

Conventional mechanisms such as those explained above suffer from a variety of deficiencies. One such deficiency is that conventional systems, BSS traffic is handled independently from mesh traffic.

Embodiments of the invention significantly overcome such deficiencies and provide mechanisms and techniques for merging BSS and mesh traffic and further to provide Overlapping BSS (OBSS) mitigation.

In a particular embodiment of a method of merging Basic Service Set (BSS) and mesh traffic, a same channel may be shared for mesh traffic and BSS traffic, the sharing of the channel including reserving a channel for BSS traffic by a Mesh Access Point (MAP), the reserving comprising sending a CC-CTS addressed to said MAP and/or blocking use of the channel by a BSS station when the channel is not reserved, the blocking use of the channel comprising the MAP sending a frame setting a NAV in the BSS.

Another particular embodiment of a method of merging BSS and mesh traffic, a same radio is shared for mesh traffic and BSS traffic, the radio switchable between serving the BSS and serving the mesh.

Still other embodiments include a system including one or more devices configured to process all the method operations disclosed herein as embodiments of the invention. In such embodiments, a communication system may employ multiple devices, wherein each device may include a memory system, a processor, communications interface in an interconnection mechanism connecting these components. The memory system is encoded with a process that provides mechanisms and techniques for merging BSS and mesh traffic as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing mechanisms and techniques for merging BSS and mesh traffic as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
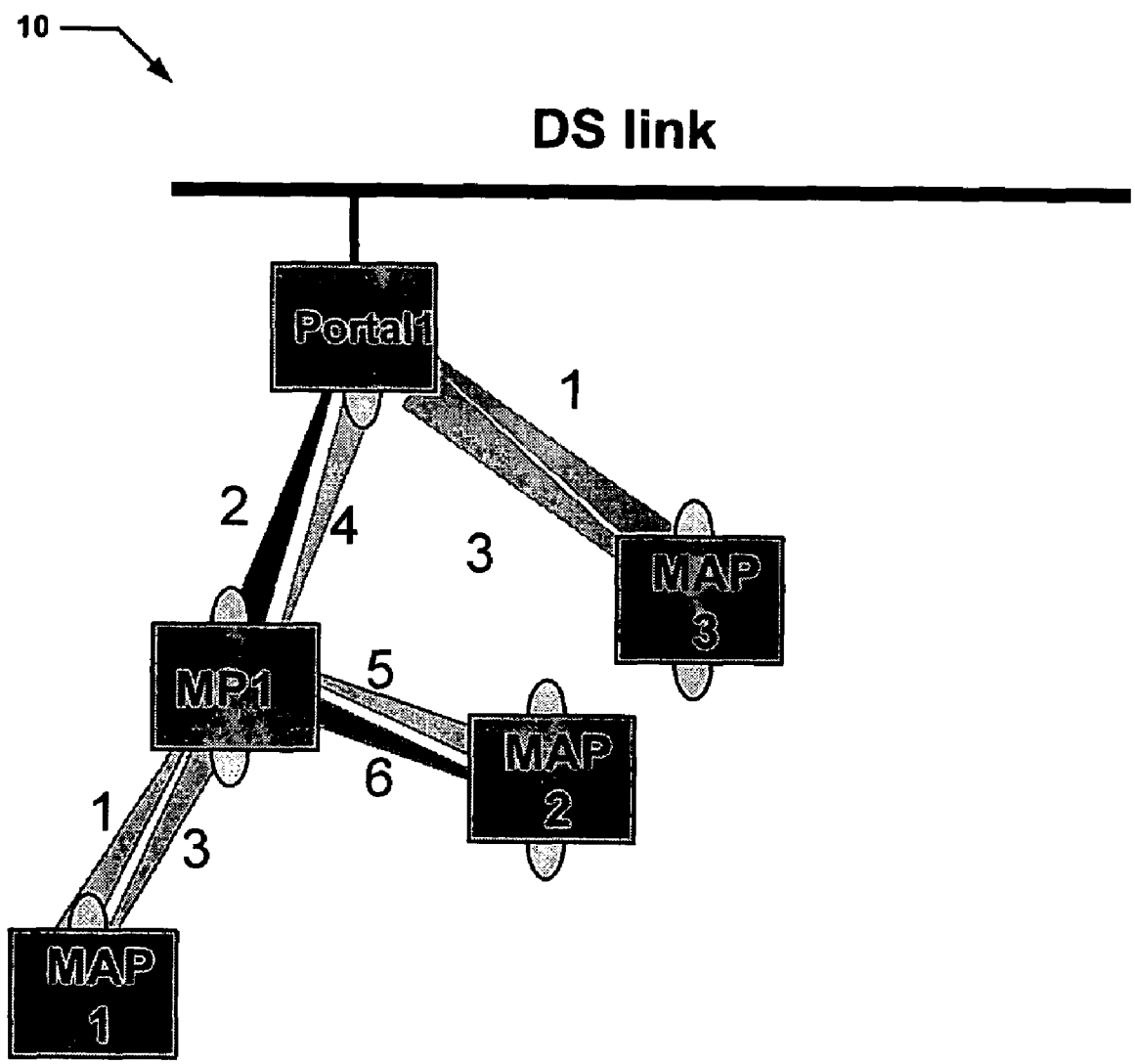
FIG. 1 comprises a diagram showing of a communications system in accordance with embodiments of the present invention.

A BSS can be served by the same channel/radio as mesh traffic. A Mesh Point (MP) has three radios for the following:

control traffic, mesh traffic, and BSS traffic. These radios may be combined. In a combined control-mesh radio the mesh traffic can be carried by the control radio, although this combination reduces the mesh throughput as all traffic is carried on the same channel. In a combined mesh-BSS radio BSS traffic can be conveyed on the same channel/radio as mesh traffic, while the BSS uses the existing 802.11 MAC protocol FIG. 1 illustrates a block diagram of a communications system. A mesh network is a network that employs one of two connection arrangements, full mesh topology or partial mesh topology. In the full mesh topology, each node is connected directly to each of the others. In the partial mesh topology, nodes are connected to only some, not all, of the other nodes. A mesh network may contain Mesh Points, Mesh Access Points (MAPs) and portals, collectively referred to as nodes. A portal is a gateway which provides an infrastructure mesh network access to a wired Distribution System (DS).

In a particular example, a channel to use for communication over the link between MP1 and MAP1 is channel 3 and is shown in ad hoc network 10. Similarly, channel selections for the remaining links are also shown in ad hoc network 10. Thus, the link between MAP1 and MP1 uses channel 1, the link between MP1 and MAP2 uses channel 6, the link between MAP2 and MP1 uses channel 5, the link between MAP3 and Portal1 uses channel 1, the link between Portal1 and MAP3 uses channel 3, the link between MP1 and Portal1 uses channel 2, and the link between Portal1 and MP1 uses channel 4.

For managed mesh networks there exists an entity responsible for the assignment of channels to all nodes and BSSs. For unmanaged mesh networks the control channel may be selected by the portal or by the first mesh point in the mesh to power on. A node selects its data channel (e.g. by using DFS). Neighboring nodes may have different assigned data channels. A MAP selects its BSS channel (e.g. by using DFS). When a mesh point is also an AP, a data channel can be the same physical channel as that used by the associated BSS. Similarly, a mesh point may be a station with its own application traffic in addition to the mesh (forwarding) traffic. The proposed MAC protocol provides mechanisms that differentiate between BSS and mesh traffic and allow for congestion control and QoS management. A Data channel can be shared by using a distributed random channel access protocol such as CSMA/CA.

When a MP receives a CC-CTS authorizing the reservation on the requested data channel, it will access the channel to transmit data using DCF/EDCA rules. If the channel is idle for a period equal to AIFS (which will be the case if there is no traffic independent of the mesh), it will transmit; otherwise it will draw a random backoff and count down. If it collides it will attempt re-transmission using a wider contention window. With respect with the NAV settings from BSS or independent traffic, if the MP has an assigned data channel, it will be synchronized with all NAV setting requests on the data channel. If the MP switches channels, it will have a chance to listen to the channel for busy status. NAV synchronization can be achieved with greater probability by tuning to the data channel before the MP is ready to transmit. The NAV adds useful information beyond what is given by carrier sensing only for transmissions that cannot be heard.

To ensure sufficient time for (re)transmission of all signaling frames, and no delays in the delivery of data frames due to signaling bottlenecks, a control channel of higher capacity (i.e. transmit rate) than the data channels can be used. Use of long TXOPs will ensure that the signaling traffic is light. Each TXOP has a fixed signaling overhead, consisting of three small control frames: CC-RTS, CC-CTS and CC-ACK. The CC-RTS to the next MP forwarding on a mesh route can be transmitted without contention, within an idle interval of length SIFS, in order to reduce mesh forwarding delays. This may occur under conditions indicating that other traffic will not be penalized, e.g. when no other CC-RTS frames are pending at the MP, or when the residual life of frames in TXOP of pending CC-RTSs is above a certain threshold value. A CC-RTS may have a data frame piggybacked to it.

When data is placed on the control channel, an MAP/MP may forward a frame to the next mesh point on the mesh path without contention, following the acknowledgement of receipt of the frame with only a SIFS idle separating the two. SIFS forwarding will be allowed provided the NAV indicates that the next mesh point on the path is free to receive the frame. Other conditions relating to congestion and priority/age of queued traffic may restrict when use of SIFS access will be permitted.

A node can be both a mesh point node and an AP, a data channel can be the same physical channel as that used by the associated BSS. Similarly, a mesh point may be a station with its own application traffic in addition to the mesh (forwarding) traffic. The proposed MAC protocol provides mechanisms that differentiate between BSS and mesh traffic and allow for congestion control and QoS management.

Channels can be shared in time between mesh traffic and BSS traffic of a mesh AP. To avoid collisions, a channel can be reserved for each of the two traffic types. The MAP can reserve a data channel for BSS traffic by sending a CC-RTS or a CC-CTS addressed to itself, or both. The CC-RTS, or the CC-CTS, indicates the data channel a MAP has selected for use in the BSS and the length of the time interval for which the BSS will have exclusive use of the data channel. Stations in the BSS may transmit to the MAP, or among themselves, and the MAP may transmit frames to the stations during the reserved time interval. This time interval is made short, and the MAP does not reserve the channel again until some time has elapsed to permit others to use of the channel.

When a data channel is used by mesh traffic, and thus is not available for BSS traffic, its use for BSS stations—legacy and 11e stations—must be blocked. In order to block use of the BSS channel by the BSS stations when it is reserved for mesh traffic, the MAP must send a frame that will set the NAV in the BSS and thus prevent all BSS stations from accessing the BSS channel for a specified time interval. MPs will be free to use the BSS channel for mesh traffic during that time interval. Any MP with data radios listening to the BSS channel must not adjust its NAV for the BSS channel according to the Duration field of the frame sent to block BSS traffic from that channel.

This can be done with various frames. For instance, the MAP may send a QoS CF-Poll frame addressed to itself on the BSS channel, with a non-zero value in the Duration field. The Duration field contains the time interval for which the BSS stations must refrain from accessing the BSS channel. Stations in the BSS will adjust their NAV accordingly. MPs will disregard such a frame. Therefore, MPs hearing a QoS CF-Poll with the same MAC address in Address1 and Address2 fields of the MAC header and non-zero Duration value will ignore such a frame, and not adjust their NAVs according to the Duration field.

A MAP will typically have separate BSS and data radios in order to be able to upload traffic to the mesh while receiving BSS traffic from its stations. A data radio in a multi-radio mesh point may be shared by BSS traffic and mesh traffic, however. To switch a radio between serving the BSS and serving the mesh, the MAP must be able to block BSS transmissions from all of its stations. As done above, the MAP sends a QoS CF-Poll frame addressed to itself on the BSS channel, specifying in the Duration field the time interval for which the BSS must refrain from accessing the channel.

Stations in the BSS will adjust their NAV accordingly. MPs will not adjust their NAV when they hear a QoS CF poll with the same MAC address in Address1 and Address2 fields of the MAC header and non-zero Duration value. During that time interval, the MAP radio can be set to any data channel, reserved by a CC-RTS sent to a mesh neighbor or by a CC-CTS received from any mesh neighbor, to transmit mesh traffic. A CC-RTS or a CC-CTS sent by the MAP to itself will indicate when the radio can be used for BSS traffic.

In addition to time-sharing a physical channel between mesh and BSS traffic, a channel may be shared among multiple BSSs with the CCC MAC protocol. This approach provides a means of addressing the problem of overlapping [co-channel] BSS using HCCA, which assumes contention-free access to the BSS channel. OBSS arises when two or more BSS with overlapping basic service areas (BSAs) use the same channel. APs, behaving as MAPs, can reserve a data channel for use in their BSS. If two or more MAPs have selected the same channel for their BSS, they can each reserve the channel by sending a CC-RTS addressed to itself, indicating the data channel it has selected for use in the BSS and the length of the reservation. Stations in a BSS may transmit to the MAP or among themselves and the MAP transmits frames to the stations during the reserved time interval. Once the channel reservation expires, the channel is made available for use by other BSS. The MAP sends a QoS CF-Poll addressed to itself to block use of the channel by its BSS members. The Duration field contains the time interval for which the BSS must refrain from accessing the data channel. This value may be extended until the MAP has secured another reservation; i.e. until the MAP has accessed the control channel to send the self-addressed CC-RTS.

For equitable sharing of the channel among co-channel BSSs, the backoff value used by the APs contending for the control channel would be fixed (not random). This way, an AP will not access the channel until all other APs had a chance to do so.

Figure 2:
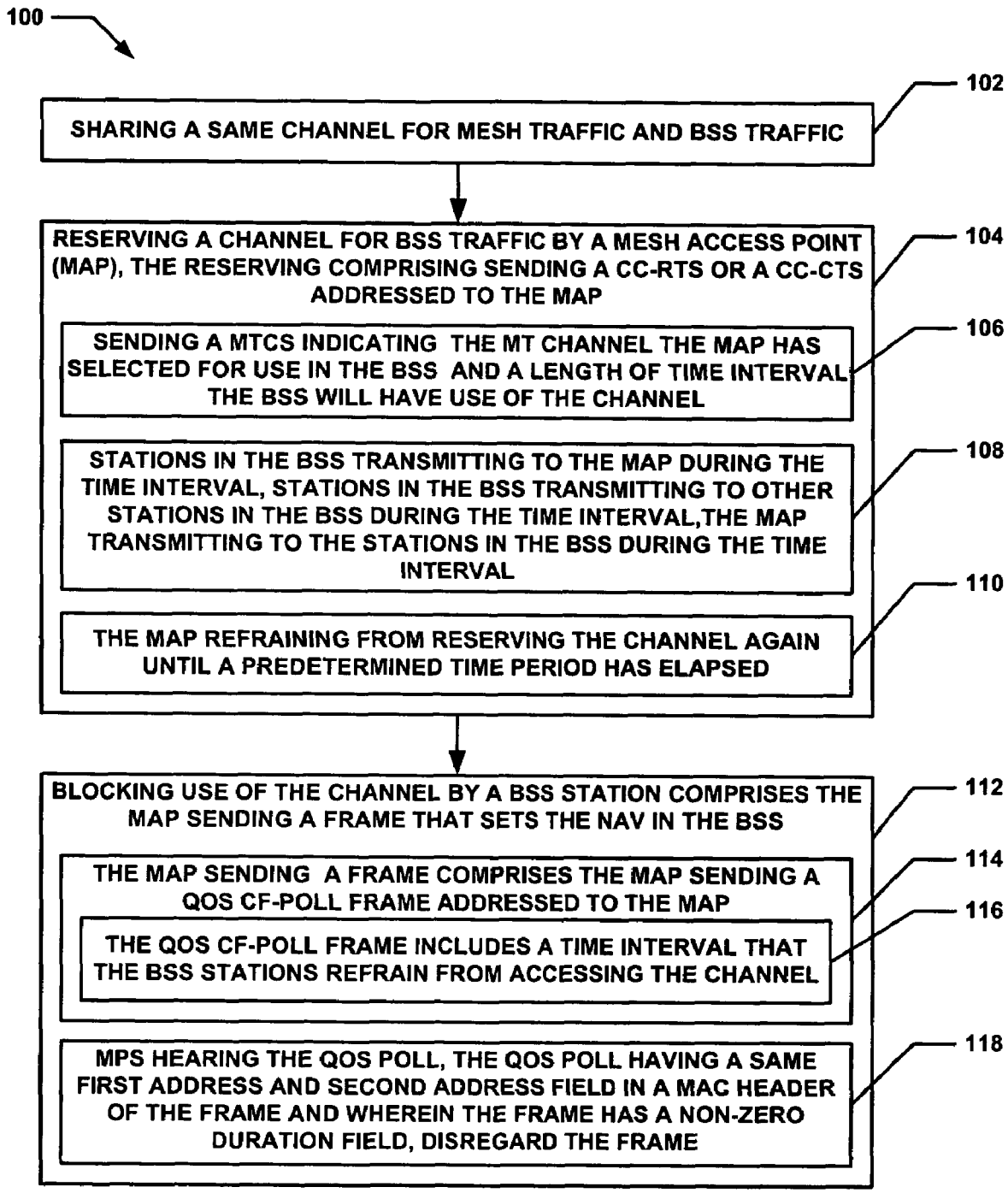
FIG. 2 comprises a flow diagram of a particular embodiment of a method of merging BSS and mesh traffic by sharing a channel in accordance with embodiments of the present invention.
Figure 3:
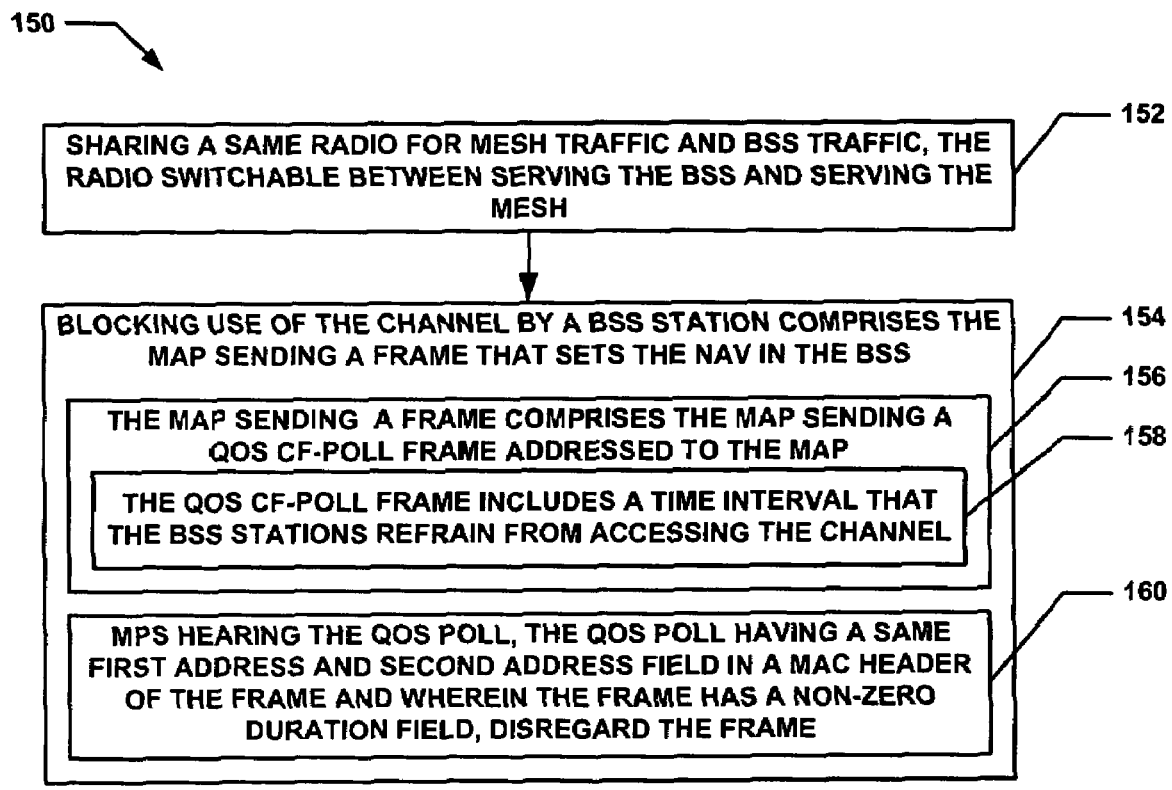
FIG. 3 comprises a flow diagram of a particular embodiment of a method of merging BSS and mesh traffic by sharing a radio in accordance with embodiments of the present invention.

Flow charts of particular embodiment of methods for merging BSS and mesh traffic are depicted in FIGS. 2 and 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of merging Basic Service Set (BSS) and mesh traffic is shown. The method 100 begins with processing block 102 which discloses sharing a same channel for mesh traffic and BSS traffic. As recited in processing block 104, the sharing a channel in one instance comprises reserving a channel for BSS traffic by a Mesh Access Point (MAP), the reserving comprising sending a CC-CTS addressed to the MAP.

Processing block 106 states the sending a CC-CTS comprises sending a CC-CTSCC-CTS indicating the Data channel the MAP has selected for use in the BSS and a length of time interval the BSS will have use of the channel.

The process continues with processing block 108 which discloses stations in the BSS transmitting to the MAP during the time interval, stations in the BSS transmitting to other stations in the BSS during the time interval and/or the MAP transmitting to the stations in the BSS during the time interval.

Processing block 110 states the MAP refraining from reserving the channel again until a predetermined time period has elapsed. This done to permit use of the channel by others.

Processing block 112 discloses blocking use of the channel by a BSS station when the channel is not reserved. The blocking use of the channel comprising the MAP sending a frame setting a NAV in the BSS.

The method continues at processing block 114 which states the blocking use of the channel by a BSS station comprises the MAP sending a frame that sets the NAV in the BSS. This may include, as recited by processing block 114 the MAP sending a QoS CF-Poll frame addressed to the MAP. As further defined by processing block 1116, the QoS CF-Poll frame includes a time interval that the BSS stations refrain from accessing the channel.

Processing block 118 states MPs hearing the QoS poll, the QoS poll having a same first address and second address field in a MAC header of the frame and wherein the frame has a non-zero duration field, disregard the frame.

Referring now to FIG. 3, another particular embodiment of another method 150 of merging Basic Service Set (BSS) and mesh traffic is shown. The method 150 begins with processing block 152 which discloses sharing a same radio for mesh traffic and BSS traffic. The radio is switchable between serving the BSS and serving the mesh.

Processing block 154 discloses blocking use of the channel by a BSS station when the channel is not reserved. The blocking use of the channel comprising the MAP sending a frame setting a NAV in the BSS. This may include, as recited by processing block 156 the MAP sending a QoS CF-Poll frame addressed to the MAP. As further defined by processing block 158, the QoS CF-Poll frame includes a time interval that the BSS stations refrain from accessing the channel.

Processing block 160 states MPs hearing the QoS poll, the QoS poll having a same first address and second address field in a MAC header of the frame and wherein the frame has a non-zero duration field, disregard the frame.

The above described methods and apparatus provide for merging of BSS and mesh traffic by either sharing a same channel for mesh traffic and BSS traffic, or sharing a radio for mesh traffic and BSS traffic, the radio switchable between serving the mesh and serving the BSS.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of merging Basic Service Set (BSS) and mesh traffic comprising:
sharing a same channel for mesh traffic and BSS traffic, the sharing a channel comprising at least one of a group consisting of:
reserving a channel for BSS traffic by a Mesh Access Point (MAP), said reserving comprising sending one of a group consisting of a CC-RTS and a CC-CTS addressed to said MAP; and
blocking use of the channel by a BSS station when the channel is not reserved, said blocking use of the channel comprising said MAP sending a frame setting a NAV in the BSS, wherein said blocking use of the channel by a BSS station comprises said MAP sending a frame on the BSS channel that sets the NAV of the stations in the BSS, wherein said MAP sending a frame comprises said MAP sending a QoS CF-Poll frame addressed to said MAP, and wherein MPs hearing said QoS poll, said QoS poll having a same first address and second address field in a MAC header of said frame and wherein said frame has a non-zero duration field, disregard said frame.

2. The method of claim 1 wherein said sending one of a group consisting of a CC-RTS and a CC-CTS comprises sending one of a group consisting of a CC-RTS and a CC-CTS indicating the data channel the MAP has selected for use in the BSS and a length of time interval said BSS will have use of said channel.

3. The method of claim 2 further comprising at least one of a group consisting of stations in said BSS transmitting to said MAP during said time interval, stations in said BSS transmitting to other stations in said BSS during said time interval, and said MAP transmitting to said stations in said BSS during said time interval.

4. The method of claim 2 further comprising said MAP refraining from reserving said channel again until a predetermined time period has elapsed.

5. The method of claim 1 wherein said QoS CF-Poll frame includes a time interval that the BSS stations refrain from accessing the channel.

6. A method of merging Basic Service Set (BSS) and mesh traffic comprising:
sharing a same radio for mesh traffic and BSS traffic, said radio switchable between serving said BSS and serving said mesh, wherein said sharing a radio comprises:
blocking use of the channel by a BSS station when the channel is not reserved, said blocking use of the channel comprising said MAP sending a frame setting a NAV in the BSS; and
setting the radio to a data channel and transmitting mesh traffic during a time interval of said NAV, wherein said MAP sending a frame comprises said MAP sending a QoS CF-Poll frame addressed to said MAP, wherein MPs hearing said QoS poll, said QoS poll having a same first address and second address field in a MAC header of said frame and wherein said frame has a non-zero duration field, disregard said frame.

7. A communication system comprising at least one BSS and at least one MAP, at least one of said BSS and said MAP comprising:
a memory;
a processor;
a communications interface;
an interconnection mechanism coupling the memory, the processor and the communications interface; and
wherein the memory is encoded with a BSS and mesh traffic merging application that when performed on the processor, provides a process for processing information, the communication system capable of performing the operations of:
sharing a same channel for mesh traffic and BSS traffic, the sharing a channel comprising at least one of a group consisting of:
reserving a channel for BSS traffic by a Mesh Access Point (MAP), said reserving comprising sending one of a group consisting of a CC-RTS and a CC-CTS addressed to said MAP; and
blocking use of the channel by a BSS station when the channel is not reserved, said blocking use of the channel comprising said MAP sending a frame setting a NAV in the BSS, wherein said blocking use of the channel by a BSS station comprises said MAP sending a frame that sets the NAV in the BSS, wherein said MAP sending a frame comprises said MAP sending a QoS CF-Poll frame addressed to said MAP, wherein said QoS CF-Poll frame includes a time interval that the BSS stations refrain from accessing the channel, and wherein said communication system is further capable of MPs hearing said QoS poll, said QoS poll having a same first address and second address field in a MAC header of said frame and wherein said frame has a non-zero duration field, disregard said frame.

8. The communication system of claim 7 wherein said operation of sending one of a group consisting of a CC-RTS and a CC-CTS comprises sending one of a group consisting of a CC-RTS and a CC-CTS indicating the data channel the MAP has selected for use in the BSS and a length of time interval said BSS will have use of said channel.

9. The communication system of claim 8 wherein said communication system is further capable of at least one of a group consisting of stations in said BSS transmitting to said MAP during said time interval, said BSS transmitting to other stations in said BSS during said time interval, and said MAP transmitting to said stations in said BSS during said time interval.

10. The communication system of claim 7 wherein said communication system is further capable of said MAP refraining from reserving said channel again until a predetermined time period has elapsed.

* * * * *